(12) United States Patent
Ng et al.

(10) Patent No.: US 8,639,247 B2
(45) Date of Patent: Jan. 28, 2014

(54) ACCESS TERMINAL SESSION AUTHENTICATION

(75) Inventors: Dennis Ng, Northboro, MA (US); Woojune Kim, Arlington, MA (US); Airin D. Cherian, Lexington, MA (US)

(73) Assignee: Ericsson Evdo Inc., Dover, DE (US)

( * ) Notice: Subject to any disclaimer, the term of this patent is extended or adjusted under 35 U.S.C. 154(b) by 865 days.

(21) Appl. No.: 11/609,645

(22) Filed: Dec. 12, 2006

(65) Prior Publication Data

US 2008/0139203 A1 Jun. 12, 2008

(51) Int. Cl.
*H04W 12/06* (2009.01)

(52) U.S. Cl.
USPC ........... 455/436; 455/411; 455/439; 455/423; 370/331; 709/238

(58) Field of Classification Search
USPC .......... 455/436, 415, 423, 411, 439; 370/331, 370/395.3; 709/238
See application file for complete search history.

(56) References Cited

U.S. PATENT DOCUMENTS

| | | | |
|---|---|---|---|
| 6,236,856 B1 * | 5/2001 | Abbadessa | 455/423 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 2002/0196749 A1 | 12/2002 | Eyuboglu et al. | |
| 2003/0100311 A1 | 5/2003 | Chung et al. | |
| 2005/0111377 A1 * | 5/2005 | Lioy et al. | 370/252 |
| 2005/0213555 A1 * | 9/2005 | Eyuboglu et al. | 370/349 |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |

(Continued)

FOREIGN PATENT DOCUMENTS

GB 2452688 3/2009

OTHER PUBLICATIONS

3GPP TS 08.58, Dec. 1999, 3GPP, vol. v8.6.0, see p. 25.*

(Continued)

*Primary Examiner* — Mahendra Patel
(74) *Attorney, Agent, or Firm* — Ericcson Evdo Inc.

(57) ABSTRACT

In addition to other aspects disclosed, a radio access network authenticates the identity of an access terminal using a session identifier and another identifier (different from the session identifier). The session identifier and the other identifier are provided by the access terminal.

39 Claims, 5 Drawing Sheets

(56) References Cited

U.S. PATENT DOCUMENTS

| | | |
|---|---|---|
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2007/0276957 A1* | 11/2007 | King et al. ............... 709/238 |
| 2008/0003988 A1 | 1/2008 | Richardson |
| 2008/0009267 A1* | 1/2008 | Ramos Robles et al. ..... 455/411 |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |

OTHER PUBLICATIONS

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "Interoperability Specification (IOS) for High Rate Packet Data (HRPD) Radio Access Network Interfaces with Session Control in the Access Network", A.S0008-A, version 3, Oct. 2008 (250 pages) (supercedes A.S0008-A, version 3.0 May 2005 version).

3rd Generation Partnership Project 2 "3GPP2", "3G Mobile Equipment Identifier (MEID)", S.R0048-A, version 4.0, Jun. 23, 2005 (15 pages).

Remote Authentication Dial in User Service (RADIUS), IETF RFC 2865, http://www.ietf.org/, Jun. 2000 (71 pages).

* cited by examiner

ACCESS TERMINAL SESSION AUTHENTICATION

BACKGROUND

This description relates to authenticating access terminal sessions.

Audio, video and multimedia content may be passed and shared among wireless devices such as cellular phones, personal digital assistants (PDAs) and computer systems (also referred to as Access Terminals or ATs). To share this content, the ATs may incorporate wireless technology such as High Data Rate (HDR) technology that enables personal broadband Internet services. Such technology may comply with standards such as an EV-DO Rev A standard (also written as 1×EV-DO Rev A or 1× Evolution-Data Optimized Revision A) or another similarly capable standard. EV-DO Rev A is included in a family of standards that are promoted by the Third Generation Partnership Project 2 (3GPP2), a collaborative Third Generation (3G) telecommunications specification-setting project associated with the development of the next generation Code Division Multiple Access (CDMA) wireless communications.

The 1×EV-DO protocol is an EVolution of the 1×RTT standard for high-speed data-only (DO) services and has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, which is also incorporated herein by reference. Revision B to this specification has been initiated as TIA/EIA/IS-856, "CDMA2000 High Rate Packet Data Air Interface Specification," 3GPP2 C.S0024-B, Version 1.0, March 2006 and is incorporated herein by reference.

A 1×EV-DO radio access network (RAN) includes ATs in wireless communication (e.g., over airlinks) with radio nodes (RNs) and that support 1×EV-DO. The radio nodes are connected to radio node controllers (RNCs) over a backhaul network that can be implemented using a shared IP or an Ethernet network (e.g., metropolitan Ethernet network) that supports many-to-many connectivity between the radio nodes and the radio node controllers. The radio access network also includes a packet data serving node, which is a wireless edge router that connects the RAN to the Internet.

To provide wireless coverage, the radio node controllers and the radio nodes of the radio access network can be grouped into clusters (referred to as radio node controller clusters). The geographical coverage area provided by each radio node controller is defined as a single 1×EV-DO subnet.

Each radio node is primarily associated with the radio node controller in its subnet, however, the radio node may also be associated (referred to as a secondary association) with a radio node controller in another subnet (e.g., an adjacent subnet). Generally, when primarily associated with a radio node controller, messages may be exchanged over one or more channels (e.g., a forward traffic channel, a reverse traffic channel, a control channel, an access channel, etc.). For a secondary association, messages may be exchanged over one or more channels, however messages are not exchanged over an access channel. Additional information concerning the primary associations of radio nodes and radio node controllers are described in U.S. application Ser. Nos. 11/037,896 filed on Jan. 18, 2005, 09/891,103, filed on Jun. 25, 2001, and 10/848,597, filed on May 18, 2004, and incorporated herein by reference. Correspondingly, information concerning the secondary associations between radio nodes and radio node controllers are described in U.S. application Ser. Nos. 11/305,286, filed on Dec. 16, 2005, and incorporated herein by reference.

Typically, in a scenario in which an AT crosses over the border from one subnet ("a source subnet") to another subnet ("a target subnet"), an A13 dormant handoff is performed between the radio node controllers of the source and target subnets. A dormant handoff is triggered by a receipt of a request message (i.e., a UATI_Request message) sent by the transitioning AT. The AT sends the request message upon realizing it has crossed over a border from one subnet to another. In some examples, the AT monitors a unique 128-bit identifier (i.e., a SectorID) of a sector parameter message that is broadcasted by each sector. All sectors that belong to the same subnet have SectorIDs that fall within a certain range. For each AT that falls within this range, a unicast access terminal identifier (UATI) (e.g., a 32-bit binary number) is assigned by a radio node controller of the particular subnet. When the access terminal moves into the coverage area of another subnet, the AT compares its UATI with the SectorID of the sector parameter message being broadcasted by the new sector. When the UATI and the SectorID do not belong to the same range, the AT sends a UATI_Request message over the access channel of the new radio node, which routes the message to the radio node controller with which it has a primary association (in this case, the radio node controller of the target subnet). The radio node controller responds to the receipt of the UATI_Request message by initiating a dormant handoff with the radio node controller of the source subnet.

To grant a handoff from the source subnet to the target subnet, the 3GPP2 standard promotes using security layer protocols to authenticate the AT. However, some ATs, AT manufacturers and Access Network (AN) manufacturers do not support the 3GPP2 security layer protocols. Thereby, a number of ATs denied access may increase absent compliance with the security protocols.

SUMMARY

In general, in some aspects of the invention, a radio access network authenticates the identity of an access terminal using a session identifier and another identifier (different from the session identifier). The session identifier and the other identifier are provided by the access terminal.

The identifier may represent information associated with the access terminal such as an access terminal identifier or a session configuration identifier. An access terminal identifier may be used for transferring an access terminal session to the radio node controller from another radio node controller. A session configuration identifier may be used for re-establishing an access terminal session with the radio node controller. The identifiers may include various types of information such as information unique to the access terminal or information that represents a unicast access terminal identifier.

Another pair of identifiers may be received from another radio node controller, for example, to transfer the access terminal session. A determination may identify if corresponding pair of identifiers match. If a match is detected, an access terminal session may be transferred to the radio node controller from another second radio node controller. In another scenario, if a match is detected, an access terminal session may be re-established with the radio node controller. Additionally, if a match is detected, a confirmation message may be sent from the radio node controller to another radio node controller to transfer the access terminal session and to terminate the access terminal session at the other radio node controller.

The session identifier and the access terminal identifier may each include numbers of various bit lengths (e.g., thirty-two bit, fifty-six bit, etc.). The access terminal identifier may include a number that uniquely identifies the access terminal.

In some aspects of the invention, a system is disclosed that includes a radio access network that authenticates the identity of an access terminal using a session identifier and another identifier (different from the first session identifier). The session identifier and the identifier are provided by the access terminal The identifiers may represent information associated with the access terminal such an access terminal identifier or a session configuration identifier. An access terminal identifier may be used for transfering an access terminal session to a radio node controller (included in the radio access node) from another radio node controller. A session configuration identifier may be used for re-establishing an access terminal session with the radio node controller. The identifiers may include various types of information such as information unique to the access terminal or information that represents a unicast access terminal identifier.

Another pair of identifiers may be received from another radio node controller, for example, to transfer the access terminal session. A determination may identify if corresponding pair of identifiers match. If a match is detected, an access terminal session may be transferred to the radio node controller from another second radio node controller. In another scenario, if a match is detected, an access terminal session may be re-established with the radio node controller. Additionally, if a match is detected, a confirmation message may be sent from the radio node controller to another radio node controller to transfer the access terminal session and to terminate the access terminal session at the other radio node controller.

The session identifier and the access terminal identifier may each include numbers of various bit lengths (e.g., thirty-two bit, fifty-six bit, etc.). The access terminal identifier may include a number that uniquely identifies the access terminal.

In some aspects of the invention, a medium bears instructions to cause a machine to, at a radio access network, authenticate the identity of an access terminal using a session identifier and another identifier (different from the first session identifier). The session identifier and the identifier are provided by the access terminal.

The identifiers may represent information associated with the access terminal such as an access terminal identifier or a session configuration identifier. An access terminal identifier may be used for transferring an access terminal session to a radio node controller included in the radio access network from another radio node controller. A session configuration identifier may be used for re-establishing an access terminal session with the radio node controller. The identifiers may include various types of information such as information unique to the access terminal or information that represents a unicast access terminal identifier.

Another pair of identifiers may be received from another radio node controller, for example, to transfer the access terminal session. A determination may identify if a corresponding pair of identifiers match. If a match is detected, an access terminal session may be transferred to the radio node controller from another second radio node controller. In another scenario, if a match is detected, an access terminal session may be re-established with the radio node controller. Additionally, if a match is detected, a confirmation message may be sent from the radio node controller to another radio node controller to transfer the access terminal session and to terminate the access terminal session at the other radio node controller.

The session identifier and the access terminal identifier may each include a number with various bit lengths (e.g., thirty-two bit, fifty-six bit, etc.). The access terminal identifier may include a number that uniquely identifies the access terminal.

Among the advantages of the techniques described here are one or more of the following.

Because two randomly generated numbers (e.g., a session identifier and an AT identifier, a session identifier and a session configuration identifier, etc.) are used to authenticate an AT prior to transferring or re-establishing of a session, the probability of a system attack or an inadvertent session re-establishment during an A13 dormant handoff is reduced. Furthermore, overhead resources are reduced compared to the needs of standardized and sophisticated security layer protocols.

Other features and advantages will be apparent from the description and the claims.

DESCRIPTION

Figure 1:
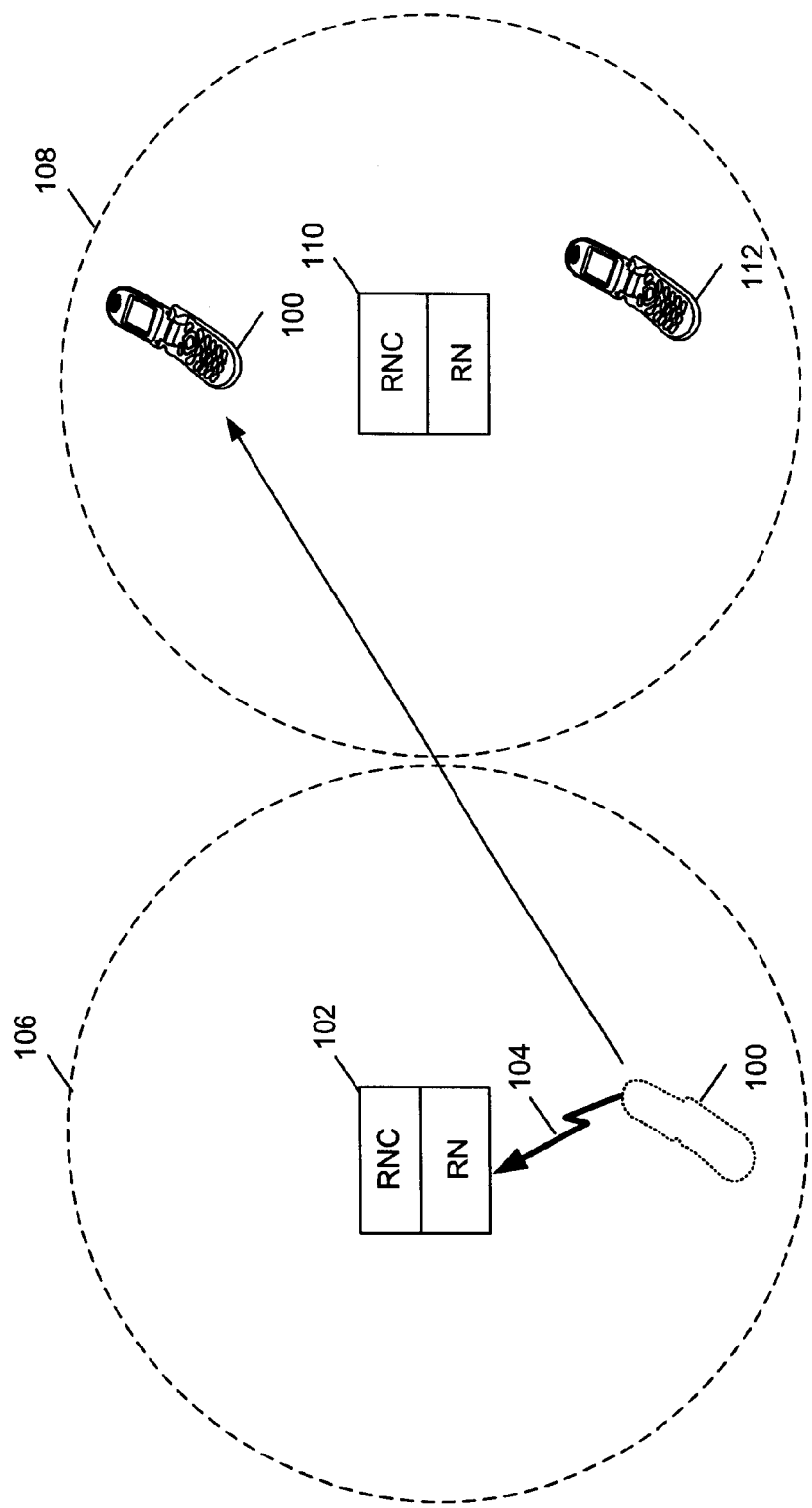
FIG. 1 is a diagram of an access terminal transiting between subnets.

Referring to FIG. 1, an EV-DO capable AT 100 (e.g., a dormant Rev-B capable AT) has an established 1×EV-DO session with a radio node controller (graphically represented in combination with a radio node) (RN/RNC) 102. A wireless link 104 provides the connection between the AT 100 and the RN/RNC 102 to establish the session. Additionally, the RN/RNC 102 may establish sessions with other ATs present in its subnet coverage area 106.

As the AT 100 transits, for example, due to user movement, the AT may enter an adjacent subnet coverage area 108 that is provided by another combination radio node and radio node controller RN/RNC 110. During the cross-over from subnet 106 to subnet 108, an A13 dormant handoff is performed between the radio node controllers respectively included in the RN/RNC 102 and the RN/RNC 110. During the handoff, as initiated by the AT 100, a session assigned by the RN/RNC 102 is transferred to the RN/RNC 110 such that the session may be continued for the AT 100. In some instances, during the handoff procedure, the transfer is granted upon request. Alternatively, in other arrangements, the identity of the AT 100 may be authenticated by the RN/RNC 110. Identification may be provided by checking a binary number (referred to as a session identifier) that is assigned to the AT 10 to identify the session. For example, when establishing the session, RN/RNC 102 assigns and provides a session identifier to the AT 100. Upon moving into the subnet 108, the AT 100 provides the session identifier to the RN/RNC 110, which then requests the session (for that session identifier) be transferred from the RN/RNC 102. The session identifier may or may not be checked prior to the session transferring from the RN/RNC 102. If checked, for example, the session identifier provided by the AT may be compared to a session identifier provided by the RN/RNC 102. If session identifiers match, the session transfer from RN/RNC 102 to RN/RNC 110 is granted.

However, the bit length of each session identifier is relatively short and may be compromised to inadvertently or improperly cause an unplanned session transfer. By inappropriately transferring a session (e.g., to RN/RNC 110), a validly established session (e.g., with RN/RNC 102) may be terminated. For example, typical session identifiers are thirty-two bit binary numbers that may be compromised by various data interception techniques. By improperly using a compromised identifier to establish a session, a rightfully assigned session may be terminated. For example, if a rogue AT 112 uses the session identifier assigned to AT 100 (by RN/RNC 102) to improperly transfer the session to the RN/RNC 110, the RN/RNC 102 may terminate the validly established session with the AT 100.

Figure 2:
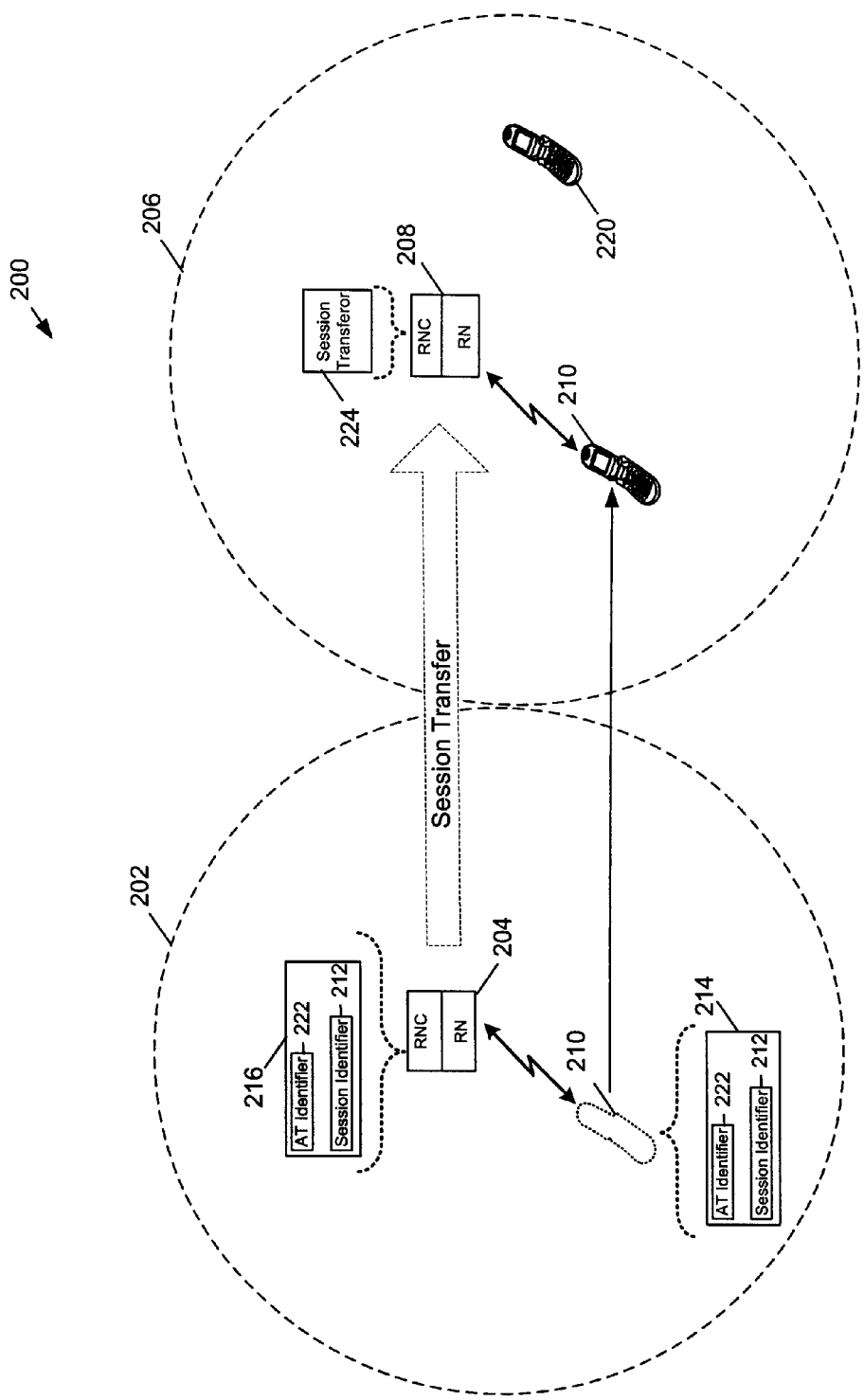
FIG. 2 is a diagram of an access terminal transferring a session between radio node controllers.

Referring to FIG. 2, an illustration of two adjacent subnets being provided by a RAN 200 is shown. One subnet 202 includes an RN/RNC 204 that may establish sessions with one or more ATs present in its coverage area. Though represented as a single unit, the functionality of the RN/RNC 204 may be separated among multiple units such as an independent radio node and an independent radio node controller. An adjacent subnet 206 similarly includes an RN/RNC 208 for establishing sessions with ATs residing in its coverage area. While this example illustrates two distinct subnets, a RAN may include any number of subnets for expanded geographical coverage and AT support.

In some implementations, some radio node controller functionality of the RN/RNCs 204 and 208 is provided by one or multiple system controller (SC) cards, of which, one or more may be active during particular time periods. Each of the RN/RNCs 204, 208 may also include input/output (I/O) cards such as basic input/output (BIO) cards that provide connectivity with a core network (e.g., an Internet Protocol (IP) network). Along with passing calls to other radio nodes for transmission to ATs, network connectivity allows information and data to be exchanged and shared among the RN/RNCs and other RAN components.

As mentioned above, due to its mobility, a dormant AT may transit from one subnet to another. For example, an AT 210 may establish a session with the RN/RNC 204 and be assigned a session identifier to uniquely represent the session. In particular, by sending a session initiation message (e.g., a UATI_Request message), the RN/RNC 204 assigns a session identifier 212 such as a UATI to the session. The session identifier 212 is provided (by the RN/RNC 204) to the AT 210 and is stored in a memory 214 (e.g., random access memory (RAM), dynamic random access memory (DRAM), etc.) included in the AT. The RN/RNC 204 also stores the session identifier 212 in a memory 216 for operations (e.g., tracking, transferring, etc.) associated with the session. The UATI session identifier 212 is a thirty-two bit binary number and includes a randomly generated number so that the identifier is uniquely assigned to the session. Other information may also be included in the session identifier 212 such as a binary number that represents the radio node (e.g., RN/RNC 204) that established the session with the AT 210.

During transit across a boundary between the subnet 202 and the subnet 206, the AT 210 attempts to transfer its session by sending another initiation message (e.g., a UATI_Request message) in response to broadcasts received from the RN/RNC 208. Based upon information included in the initiation message, the RN/RNC 208 identifies the radio node that established the session and sends a transfer request message (e.g., an A13-Session Information Request message) to the source RN/RNC 204. Along with identifying the target RN/RNC 208, the transfer request message also includes the session identifier provided by the AT 210. Upon receiving the transfer request message, the source RN/RNC 204 determines if the session identifier is recognized (e.g., compares the provided session identifier to session identifiers stored in the memory 216). If recognized, the source RN/RNC 204 sends a response message (e.g., an A13-Session Information Response message) to the target RN/RNC 208 to acknowledge that the session may transfer. To transfer the session, the target RN/RNC 208 assigns a new session identifier (e.g., another UATI) to the AT 210. The new session identifier includes a binary number that identifies the target RN/RNC 208 as the new source and the identifier is provided to the AT 210 for storage along with being stored in a memory (not shown) included in the RN/RNC 208. The target RN/RNC 208 also sends a confirmation message (e.g., an A13-Session Information Confirm message) to the source RN/RNC 204, which terminates the session by allowing the session identifier 212 to be assigned to a newly established session.

In such a transfer scheme, an AT may have be assigned a new session identifier by a target RN/RNC and thereby cause a current session at another RN/RNC (or the same RN/RNC) to be terminated. For example, an AT 220 may improperly (e.g., acting as a rogue AT) or inadvertently provide a session identifier to a target RN/RNC (e.g., RN/RNC 208) to initiate a session transfer and thereby cause a valid session of another AT to be terminated. For instance, by using the session identifier 212, the rogue AT 220 may cause the session of AT 210 to be terminated (prior to its transiting from subnet 202 to subnet 206).

To reduce the probability of a session identifier being used inadvertently or improperly to transfer a session, another number associated with a requesting AT is used for authentication prior to granting the transfer. For example, along using a session identifier for AT authentication, a random number that uniquely identifies the AT is also used during authentication. The random number may incorporate various types of numbers, textual characters (e.g., an American Standard Code for Information Interchange (ASCII) string) or alphanumeric characters. One or more techniques may be implemented to produce the random number (e.g., a random number generator).

By using a random binary number that identifies the AT, along with a binary number session identifier, the number of bits used in the determination increases (e.g., doubles to sixty-four bits) and the probability of improperly transferring a session is reduced. An AT identifier, typically assigned by the manufacturer of the AT during production, is thirty-two bits in length and is referred to as an electronic serial number (ESN). In another example, a fifty-six bit Mobile Equipment Identifier (MEID) may be assigned to the AT and used as an AT identifier. In this illustration, an AT identifier 222 is stored in the memory 214 during production of the AT 210 and may be accessed, for example, to transfer a session.

In addition to reducing the probability of a session being improperly terminated, using AT identifiers provides a relatively simple authentication methodology. Since each AT identifier is unique, complex security protocols that may (or may not) be supported by each type of AT or AT manufacturer need not be used. For example, along with checking the session identifier 212, the AT identifier 222 may be checked to transfer a session as the AT 210 transits from subnet 202 to subnet 206. While requesting a session with the RN/RNC 204, the AT 210 provides the AT identifier 222 (also stored in the memory 214) to the RN/RNC 204. Upon receiving the AT identifier 222, the RN/RNC 204 stores it in the memory 216. A relationship is formed between the AT identifier 222 and the session identifier 212 by the RN/RNC 204. For example, both identifiers may be stored in a common memory location or linked by a software application. By storing the session and AT identifiers 212 and 222 in the memory 216, the RN/RNC 204 may relatively quickly determine which AT is associated with which particular unicast session.

As AT 210 transfers from subnet 202 to subnet 206, both the session identifier 212 and AT identifier 222 are used for AT authentication. While crossing the boundary between the subnets, AT 210 send a session transfer request (that includes the session identifier 212 and AT identifier 222) to the RN/RNC 208. In response, the target RN/RNC 208 sends a request to the source RN/RNC 204 to confirm that the session identifier is associated with the AT identifier. If confirmed by the source RN/RNC 204, the target RN/RNC 208 assigns a new session identifier to establish a session with the AT 210. Additionally, the target RN/RNC 208, stores the new session identifier and AT identifier 222 in a memory (not shown) to further uses such as confirming a future transfer. Additionally, the source RN/RNC 204 terminates any session using the session identifier 212 and places the session identifier up for reassignment (e.g., to another AT session). If the session identifier 212 and the AT identifier 222 are not confirmed by the source RN/RNC 204, transfer is not granted and the corresponding session is not terminated by the source RN/RNC 204. In such a scenario, the AT 210 might request to establish a new unicast session with the RN/RNC 208 and be assigned a session identifier.

In this implementation, a session transferor 224 is executed by the RN/RNC 208 to determine whether or not to transfer a session. For a session transfer to be granted, the requesting AT needs to provide both a session identifier (associated with the session to be transferred) and the AT identifier that is uniquely assigned to the AT. Upon, receiving confirming information from a source RN/RNC (e.g., RN/RNC 204) a new session identifier is assigned and provided to the requesting AT. In particular, the session transferor 224 compares the information (e.g., session identifier and AT identifier) provided by the AT 210 and the information (e.g., session identifier and AT identifier) from the source RN/RNC 204. If the information matches, the session is transferred from the RN/RNC 204 to the RN/RNC 208. If the provided session identifiers or the AT identifiers do not match, the session is not transferred from the RN/RNC 204 and the AT 210 must request a new session from the RN/RNC 208.

By using the AT identifier to transfer a session (along with the session identifier), the requesting AT may be authenticated relatively quickly absent the involvement of complicated security protocols that may or may not be supported by each AT. Additionally, by authenticating with the session identifier and the AT identifier, the number of bits used to authenticate the AT increases (e.g., doubles: thirty-two bit session identifier plus a thirty-two bit ESN AT identifier) and reduces the probability of inadvertent or improper session termination. The probability may be further reduced by increasing the number of bits included in the session identifier or the AT identifier or both. For example, by implementing a fifty-six bit MEID, the AT identifier length is increased and the probability of improper session termination correspondingly decreases.

Figure 3:
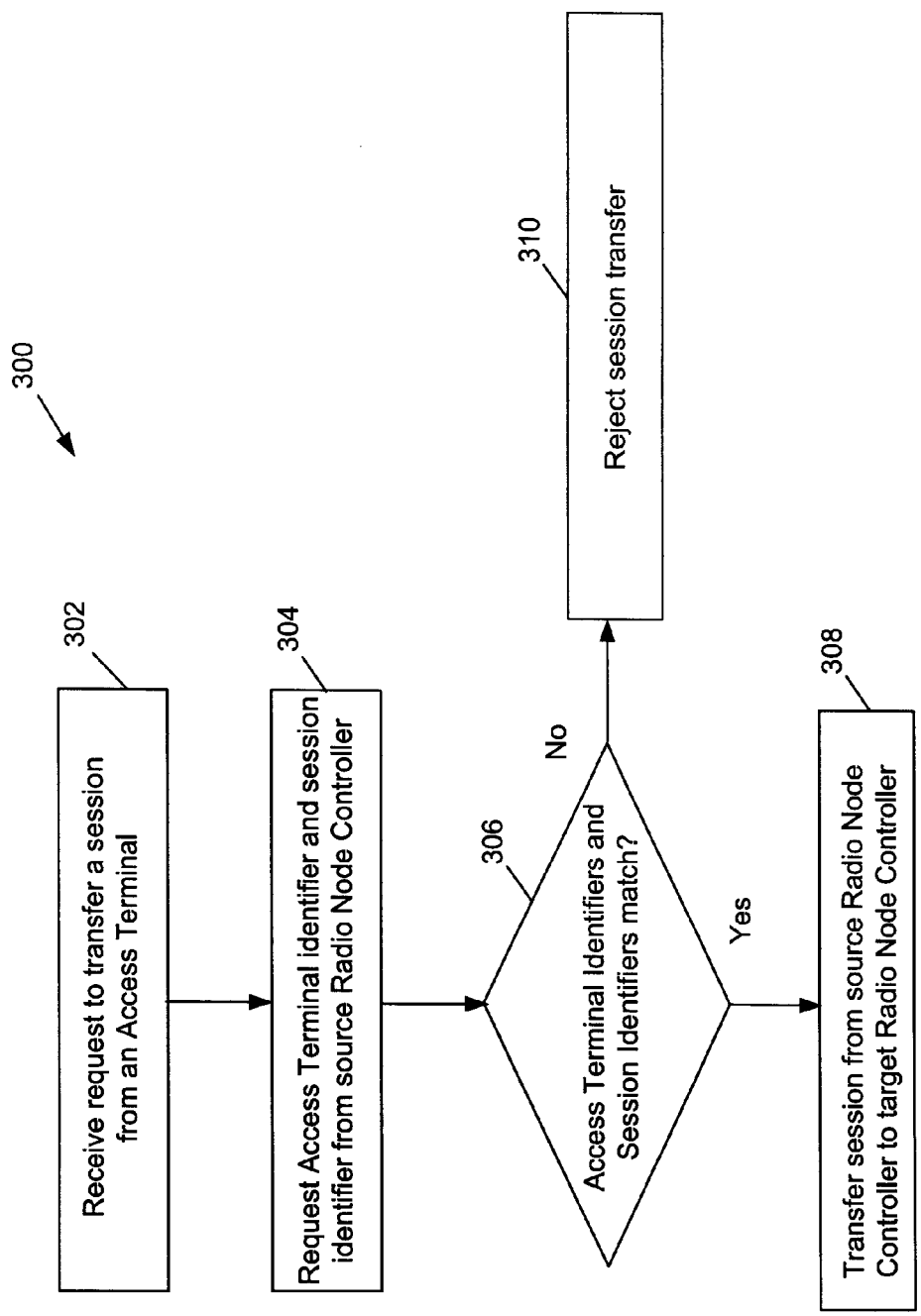
FIG. 3 is a flow chart of operations executed by a session transferor.

Referring to FIG. 3, a flowchart 300 represents some of the operations of the session transferor 224. As mentioned above, the session transferor 224 may be executed by the RN/RNC 208. For example, a computer system or other type of computation device associated with the RN/RNC 208 may execute the session transferor 224. Furthermore, the session transferor 224 may be executed at one or more other locations in RAN 200. For example, rather than being executed by the RN/RNC 208, the session transferor 224 may be executed by the RN/RNC 204 to process potential session transfers from other RN/RNCs to RN/RNC 204 or to process potential session transfers to other RN/RNCs (e.g., RN/RNC 208), for example. Along with being executed at a single site (e.g., RN/RNC 208), executed operations may be distributed among two or more sites.

Operations of the session transferor 224 include receiving 302 a request to transfer a session from an AT. Along with requesting the transfer, other information such as the identity of a source RN/RNC, a session identifier and an AT identifier may be provided with the request. As mentioned above, the AT identifier is unique to the AT and may be a randomly generated binary number (e.g., a thirty-two bit ESN, a fifty-six bit MEID, etc.). Similarly, the session identifier may be a randomly generated binary number (e.g., a thirty-two bit UATI). Operations also include requesting 304 the AT identifier and the session identifier from the source RN/RNC (e.g., RN/RNC 204) that has been servicing the established session of the requesting AT.

By respectively comparing the session identifiers and AT identifiers, the session transferor 224 determines whether the requesting AT is authentic and whether to transfer the session from the source RN/RNC to the target RN/RNC. To provide the comparison, operations of the session transferor 224 include determining 306 if the AT identifiers (received from the requesting AT and the source RN/RNC) match and if the session identifiers (received from the requesting AT and the source RN/RNC) match. If both pairs of identifiers match, operations include transferring 308 the session from the source RN/RNC to the target RN/RNC, as requested by the AT. In some arrangements, a message (e.g., a confirmation message) is sent to the source RN/RNC. The source RN/RNC may execute one or more operations to terminate any active sessions associated with the session identifier used in the target RN/RNC comparison. By "cleaning up" the currently active sessions, the source RN/RNC reduces the probability of two active sessions having the same session identifier and conserves identifiers that may be provided to other sessions. Additionally, to transfer the session, the target RN/RNC may assign a new session identifier to the requesting AT.

If the AT identifiers or the session identifiers do not match, operations may include rejecting 310 the session transfer from the source RN/RNC. Such an operation may be executed by not sending a message (e.g., a confirmation message) to the source RN/RNC, thereby no request is made by the target RN/RNC to transfer the session from the source RN/RNC. In executing these operations, a session may be transferred from one RN/RNC to another by authenticating a requesting AT with two binary numbers (e.g., a session identifier and an AT identifier). In the previous example, an AT is authenticated to transfer a session, however, an AT may also be authenticated for performing other operations such as re-establishing a session with an RN/RNC.

Figure 4:
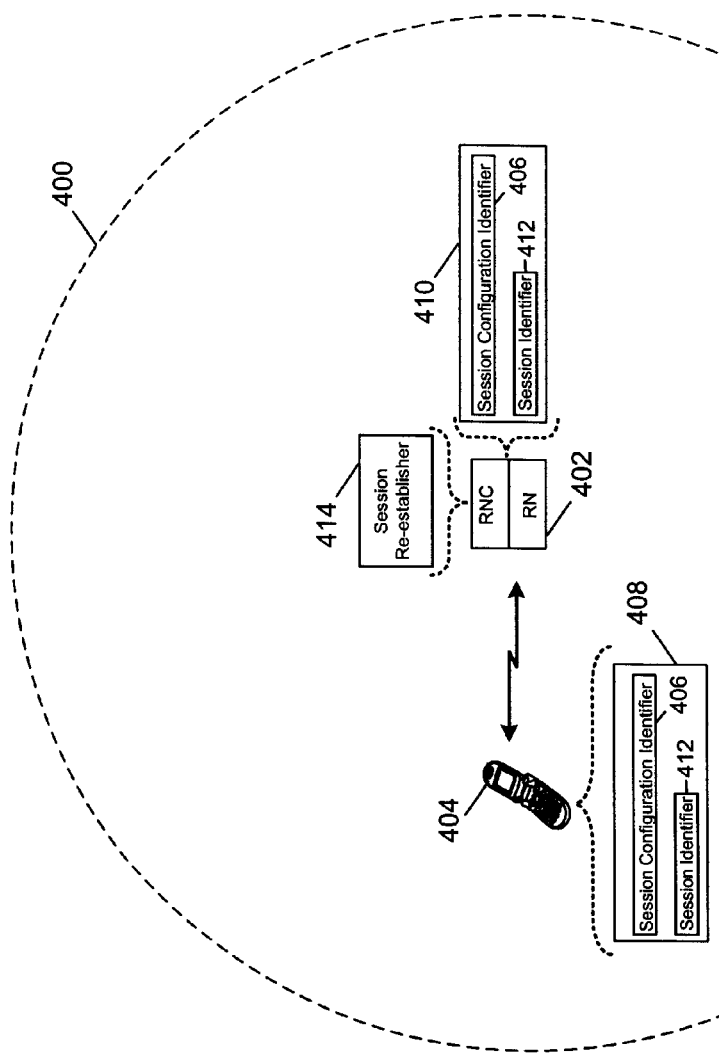
FIG. 4 is a diagram of an access terminal re-establishing a session with a radio node controller.

Referring to FIG. 4, a subnet 400 represents coverage area provided by a RN/RNC 402. Similar to the coverage areas 202 and 206 shown in FIG. 2, the RN/RNC 402 may establish unicast sessions with one or more ATs located within the coverage area (e.g., an AT 404). Upon the AT 404 requesting the establishment of a session, the RN/RNC 402 negotiates one or more parameter settings with the AT. Upon completion of the parameter negotiations, a configuration complete message is sent from the RN/RNC 402 to the AT 404. This message includes information such as a session configuration identifier 406 (e.g., a session configuration token) that contains data that represents selected protocols and negotiation parameters. For example, the configuration identifier 406 may include a binary number (e.g., sixteen bit binary number), which includes a random number (e.g., twelve bits) to uniquely identify the configuration identifier and a predefined number (e.g., four bits) to represent selected protocols and negotiation parameters.

Along with being stored in a memory 408 included in the AT 404, the session configuration identifier 406 is also stored in a memory 410 included in the RN/RNC 402. Additionally, a session identifier 412 (e.g., a UATI) is generated and assigned by the RN/RNC 402 to represent the established session. Along with being stored in the memory 410, the session identifier 412 is provided to the AT 404 and is stored in the memory 408. In some arrangements other data may also be exchanged between the AT 404 and the RN/RNC 402. For example, a binary number (e.g., a thirty-two bit ESN, a fifty-six bit MEID, etc.) that uniquely identifies the AT 404 that is stored in the AT may be provided to the RN/RNC 402.

Along with storing the identifiers 406 and 412, the RN/RNC 402 links the identifiers to associate both binary numbers with the established session. For example, the two binary numbers may be related through a common memory location or associated by a software application. By associating these binary numbers with the established session, the binary values may be used to re-establish the session, if terminated, for example.

As previously mentioned, a session identifier may be determined by interception techniques and improperly used by a rogue AT or inadvertently re-assigned to another AT to establish a unicast session. In such scenarios, the AT originally provided the session identifier may attempt to re-establish a terminated session and may be denied (due to a session inadvertently established by another AT or by a rogue AT). To reduce the probability inappropriate assignments, additional data (along with the session identifier) may be requested from an AT to re-establish a unicast session with the RN/RNC 402. For example, in a manner similar to using an AT identifier (and a session identifier) to transfer a session from one RN/RNC to another, providing a session configuration identifier (along with the session identifier) may be required to re-establish a unicast session with an RN/RNC. By increasing the amount of data needed to re-establish a session, the probability of an improper session being established is reduced since both the session identifier and the session configuration identifier would need to be compromised or inadvertently used.

To re-establish a session, a session re-establisher 414 is executed by the RN/RNC 402. For example, a computer system or other type of computing device associated with the RN/RNC 402 may execute the session re-establisher 414. In one illustration, the AT 404 establishes a unicast session with the RN/RNC 402. Due to an event, the session is terminated. For example, after a predefined period of time (e.g., six hours, fifty-four hours, etc.), the session between the AT 404 and the RN/RNC 404 may be considered dormant. To conserve bandwidth, the RN/RNC 404 may terminate sessions identified as dormant such that the session identifiers associated with the dormant sessions may be reused. However, the AT may be unaware that its session has be identified as dormant by the RN/RNC 402. For example the session associated with AT 404 may be identified as dormant by the RN/RNC 402 and correspondingly terminated. Furthermore, before the AT 404 determines that the session has been terminated (and attempts to re-establish the session), the RN/RNC 402 may re-assign the session identifier to another AT for establishing another session. Thereby, a conflict may appear when the AT 404 attempts to re-establish the session with the session identifier.

To allow the AT 404 to re-establish a session and reduce the possibility of an inadvertent session or rogue session being established, the session re-establisher 414 requests information from the AT 404 (upon or during its request for session re-establishment). In particular, the session re-establisher 414 requests that the AT 404 provide the session identifier 412 and the session configuration identifier 406 for authentication. Alternatively, the session identifier 412 and the session configuration identifier 406 may be included in a request from the AT 404 to initiate a session re-establishment. Upon receiving both binary numbers from the AT 404, the session re-establisher 414 retrieves the data (e.g., the session identifier and the session configuration identifier) from the memory 410. By comparing the two pairs of data, the session re-establisher 414 determines if the AT 404 had previously established a valid session with the RN/RNC 402. If the comparison determines that the AT 404 has provided valid data, service continues. In one scenario, upon re-establishing a session, a previous session may be used, or, in other scenarios a new session may be established. Accordingly, a new session identifier or a previously used session identifier may be assigned to the re-established session. This session identifier would also be stored in the memory 410 and be associated with the session configuration identifier 406. In the case that a new session identifier is produced and assigned to the session between the AT 404 and the RN/RNC 402, any intervening sessions assigned to the session identifier 412 may remain active and continue to use the session identifier. If the comparison of the two pairs of data indicates that AT 404 has provided invalid data, the AT may be locked out by the session re-establisher 414 from further attempts to establish a session or re-establishing an alleged previous session with the RN/RNC 402. Alternatively, if invalid data is provided, a new session may be established.

Figure 5:
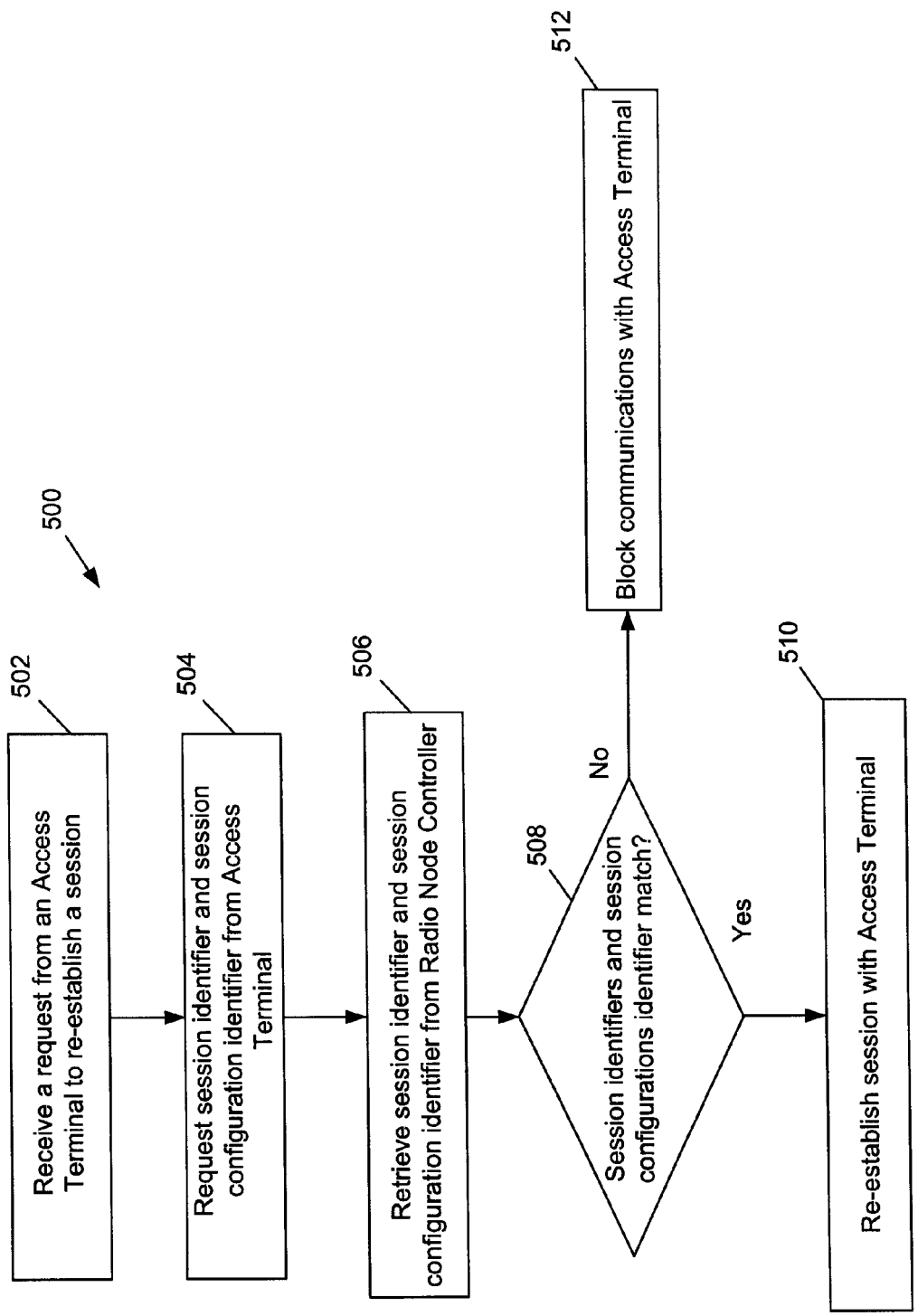
FIG. 5 is a flow chart of operations executed by a session re-establisher.

Referring to FIG. 5, a flowchart 500 that represents some of the operations of the session re-establisher 414 is shown. As mentioned above, the session re-establisher 414 may be executed by the RN/RNC 402. For example, a computer system or other type of computation device associated with the RN/RNC 402 may execute the session re-establisher 414. Furthermore, the session re-establisher 414 may be executed at one or more locations. For example, rather than being executed by the RN/RNC 402, the session re-establisher 414 may be executed by another RN/RNC to re-establish terminated sessions, for example. Along with being executed at a single site (e.g., RN/RNC 402), operation execution may be distributed among two or more sites.

Operations of the session re-establisher 414 include receiving 502 a request from an AT to re-establish a session. As mentioned above, this request may be sent, for example, from an AT associated with an improperly terminated session or from a rogue AT attempting to improperly establish a session. Operations of the session re-establisher 414 also include requesting 504 a session identifier and a session configuration identifier from the requesting AT. Although, in some implementations, one or both of the session identifier and session configuration identifier may be provided in the request from the AT. Additionally, operations include retrieving 506 the session identifier and the session configuration identifier from the RN/RNC (e.g., from a memory included in the RN/RNC).

Upon receiving these two data sets, the session re-establisher 414 determines 508 if the respective pair of session identifiers and pair of session configuration identifiers match. If the identifier pairs match, the AT is authenticated and is associated with a valid unicast session. Upon authenticating the AT and validating the session, operations include re-establishing 510 the session with the AT. In some arrangements, the session is re-established by the RN/RNC sending a message to the AT that provides a new session identifier and notifies the AT to use the new session identifier (rather than the previous session identifier). The session re-establisher 414 may also direct an AT to continue to use the previous session identifier assigned to that AT. If a match is not detected, operations of the session re-establisher 414 may include blocking 512 the AT from communicating with the RN/RNC. For example, the AT may be denied from attempting to establish a session.

In some embodiments one or more processors may execute instructions to perform the operations of the session transferor 224 and the session re-establisher 414, e.g., respectively represented in flowchart 300 and 500. For example, one or more general processors (e.g., a microprocessor) and/or one or more specialized devices (e.g., an application specific integrated circuit (ASIC), etc.) may execute instructions. One or more of the processors may be implemented in a single integrated circuit as a monolithic structure or in a distributed structure. In some embodiments the instructions that are executed by the processors may reside in a memory (e.g., random access memory (RAM), read-only memory (ROM), static RAM (SRAM), etc.). The instructions may also be stored on one or more mass storage devices (e.g., magnetic, magneto-optical disks, or optical disks, etc.).

One or more of the operations associated with the session transferor 224 and the session re-establisher 414 may be performed by one or more programmable processors (e.g., a microprocessor, an ASCI, etc.) executing a computer program. The execution of one or more computer programs may include operating on input data (e.g., data provided from a source external to the RAN, etc.) and generating output (e.g., sending data to a destination external to the RAN, etc.). The operations may also be performed by a processor implemented as special purpose logic circuitry (e.g., an FPGA (field programmable gate array), an ASIC (application-specific integrated circuit), etc.).

Operation execution may also be executed by digital electronic circuitry, or in computer hardware, firmware, software, or in combinations of them. The operations described in flowcharts 300 and 500 (along with other operations of the session transferor 224 and the session re-establisher 414) may be implemented as a computer program product, e.g., a computer program tangibly embodied in an information carrier, e.g., in a machine-readable storage device (e.g., RAM, ROM, hard-drive, CD-ROM, etc.) or in a propagated signal. The computer program product may be executed by or control the operation of, data processing apparatus, e.g., a programmable processor, a computer, or multiple computers. A computer program may be written in one or more forms of programming languages, including compiled or interpreted languages, and it can be deployed in any form, including as a stand-alone program or as a module, component, subroutine, or other unit suitable for use in a computing environment. A computer program may be deployed to be executed on one computing device (e.g., controller, computer system, etc.) or on multiple computing devices (e.g., multiple controllers) at one site or distributed across multiple sites and interconnected by a communication network.

Other embodiments are within the scope of the following claims.

What is claimed is:

1. A method comprising:
a radio access network, authenticating the identity of an access terminal using a first session identifier and a first identifier, different from the first session identifier, wherein the first session identifier and the first identifier are provided by the access terminal and the first identifier is unique to the access terminal, and the first session identifier is for comparing to at least another session identifier, wherein the radio access network is configured to provide a session configuration identifier to the access terminal for re-establishing a terminated access terminal session between the access terminal and the radio access network, wherein the configuration identifier includes a random number and a predefined number, and represents parameter settings negotiated between the radio access network and the access terminal and one or more selected protocols.

2. The method of claim 1 wherein the authentication is determined by a first radio node controller included in the radio access network.

3. The method of claim 2 wherein the first identifier represents an access terminal identifier for transferring an access terminal session from a second radio node controller to the first radio node controller.

4. The method of claim 3 wherein the transferring includes an A13 dormant handoff.

5. The method of claim 1 wherein the first identifier includes a unicast access terminal identifier.

6. The method of claim 2 further comprising:
receiving a second session identifier and a second identifier from a second radio node controller.

7. The method of claim 6 further comprising:
determining if the first session identifier matches the second session identifier and if the first identifier matches the second identifier.

8. The method of claim 7 further comprising:
transferring an access terminal session from the second radio node controller to the first radio node controller, if a match is detected.

9. The method of claim 7 further comprising:
re-establishing an access terminal session with the first radio node controller, if a match is detected.

10. The method of claim 7 further comprising:
sending a confirmation message to the second radio node controller to transfer an access terminal session to first radio node controller and to initiate termination of the access terminal session at the second radio node controller, if a match is detected.

11. The method of claim 1 wherein the first identifier includes a thirty-two bit number.

12. The method of claim 1 wherein the first identifier includes a fifty-six bit number.

13. The method of claim 1 wherein the first identifier includes a thirty-two bit number unique to the access terminal.

14. A system comprising:
a radio access network to authenticate the identity of an access terminal using a first session identifier and a first identifier, different from the first session identifier, wherein the first session identifier and the first identifier are provided by the access terminal and the first identifier is unique to the access terminal, and the first session identifier is for comparing to at least another session identifier, wherein the radio access network is configured to provide a session configuration identifier to the access terminal for re-establishing a terminated access terminal session between the access terminal and the radio access network, wherein the configuration identifier includes a random number and a predefined number, and represents parameter settings negotiated between the radio access network and the access terminal and one or more selected protocols.

15. The system of claim 14 wherein the radio access network includes a first radio node controller to authenticate the access terminal.

16. The system of claim 15 wherein the first identifier represents an access terminal identifier for transferring an access terminal session from a second radio node controller to the first radio node controller.

17. The system of claim 16 wherein the transferring includes an A13 dormant handoff.

18. The system of claim 14 wherein the first identifier includes a unicast access terminal identifier.

19. The system of claim 15 wherein the first radio node controller is capable of receiving a second session identifier and a second identifier from a second radio node controller.

20. The system of claim 19 wherein the first radio node controller is capable of determining if the first session identifier matches the second session identifier and if the first identifier matches the second identifier.

21. The system of claim 20 wherein the second radio node controller transfers an access terminal session to the first radio node controller, if a match is detected.

22. The system of claim 20 wherein the first radio node controller re-establishes an access terminal session with the access terminal, if a match is detected.

23. The system of claim 20 wherein the first radio node controller is capable of sending a confirmation message to the second radio node controller to initiate transfer of the access terminal session to the first radio node controller and to initiate termination of the access terminal session at the second radio node controller, if a match is detected.

24. The system of claim 14 wherein the first identifier includes a thirty-two bit number.

25. The system of claim 14 wherein the first identifier includes a thirty-two bit number unique to the access terminal.

26. The system of claim 14 wherein the first identifier includes a fifty-six number.

27. A storage device bearing instructions to cause a machine to:
at a radio access network, authenticate the identity of an access terminal using a first session identifier and a first identifier, different from the first session identifier, wherein the first session identifier and the first identifier are provided by the access terminal and the first identifier is unique to the access terminal, and the first session identifier is for comparing to at least another session identifier, wherein the radio access network is configured to provide a session configuration identifier to the access terminal for re-establishing a terminated access terminal session between the access terminal and the radio access network, wherein the configuration identifier includes a random number and a predefined number, and represents parameter settings negotiated between the radio access network and the access terminal and one or more selected protocols.

28. The storage device of claim 27 wherein the authentication is determined by a first radio node controller included in the radio access network.

29. The storage device of claim 28 wherein the first identifier represents an access terminal identifier for transferring an access terminal session from a second radio node controller to the first node controller.

30. The storage device of claim 29 wherein the transferring includes an A13 dormant handoff.

31. The storage device of claim 27 wherein the first identifier includes a unicast access terminal identifier.

32. The storage device of claim 28 further comprising instructions to cause the machine to:
receive a second session identifier and a second identifier from the second radio node controller.

33. The storage device of claim 32 further comprising instructions to cause the machine to:
determine if the first session identifier matches the second session identifier and if the first identifier matches the second identifier.

34. The storage device of claim 33 further comprising instructions to cause the machine to:
transfer an access terminal session from the second radio node controller to the first radio node controller, if a match is detected.

35. The storage device of claim 33 further comprising instructions to cause the machine to:
re-establish an access terminal session with the first radio node controller, if a match is detected.

36. The storage device of claim 33 further comprising instructions to cause the machine to:
send a confirmation message to the second radio node controller to initiate transfer of an access terminal session to the first radio node controller and to initiate termination of the access terminal session at the second radio node controller, if a match is detected.

37. The storage device of claim 27 wherein the first identifier includes a thirty-two bit number.

38. The storage device of claim 27 wherein the first identifier includes a fifty-six bit number.

39. The storage device of claim 27 wherein the first identifier includes a thirty-two bit number unique to the access terminal.

* * * * *